United States Patent
Eicholz et al.

(10) Patent No.: US 10,372,795 B2
(45) Date of Patent: Aug. 6, 2019

(54) CONDITIONALLY CONTROLLED STYLING

(71) Applicant: Microsoft Technology Licensing, LLC, Redmond, WA (US)

(72) Inventors: Arron J. Eicholz, Enumclaw, WA (US); Travis Leithead, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 119 days.

(21) Appl. No.: 15/068,565

(22) Filed: Mar. 12, 2016

(65) Prior Publication Data
US 2016/0275053 A1    Sep. 22, 2016

Related U.S. Application Data

(60) Provisional application No. 62/135,161, filed on Mar. 18, 2015.

(51) Int. Cl.
*G06F 17/22* (2006.01)
*G06F 16/957* (2019.01)

(52) U.S. Cl.
CPC ...... *G06F 17/2247* (2013.01); *G06F 16/9577* (2019.01); *G06F 17/227* (2013.01); *G06F 17/2241* (2013.01)

(58) Field of Classification Search
CPC . G06F 17/2247; G06F 17/2241; G06F 17/227
See application file for complete search history.

(56) References Cited

U.S. PATENT DOCUMENTS

| | | |
|---|---|---|
| 7,681,178 B1 | 3/2010 | George et al. |
| 7,996,765 B1 | 8/2011 | Mitnick et al. |
| 8,745,027 B1 | 6/2014 | Haustein et al. |
| 2007/0078735 A1 | 4/2007 | Wan et al. |
| 2012/0066585 A1 | 3/2012 | Caceres |

(Continued)

OTHER PUBLICATIONS

Jason Gerner et al., Professional LAMP—Linux, Apache, My SQL and PHP5 Web Development, 2005, John Wiley & Sons, pp. 192-193.*

(Continued)

*Primary Examiner* — Scott T Baderman
*Assistant Examiner* — Seung Woon Jung
(74) *Attorney, Agent, or Firm* — Arent Fox LLP (57) ABSTRACT

In one example, a document rendering device may create a document from a document tree by determining whether a style property of a source node of the document tree may be applied to a target node of that document tree. The document rendering device may store a document tree having multiple nodes describing a document having component arranged hierarchically in a parent-child relationship. The document rendering device may identify a styling permission describing whether a target node representing a child component of the document tree permits application of a style property to the target node. The document rendering device may execute an inheritance determination for the target node based on the styling permission to determine whether the target node inherits the style property from a source node representing a parent component. The document rendering device may render the target node based on the inheritance determination to create a document component of the document.

18 Claims, 7 Drawing Sheets

(56) References Cited

U.S. PATENT DOCUMENTS

| | | | |
|---|---|---|---|
| 2012/0254731 A1 | 10/2012 | Peters et al. | |
| 2012/0284616 A1* | 11/2012 | Melnyk | G06F 17/30905 715/235 |
| 2013/0159839 A1 | 6/2013 | Joffray et al. | |
| 2013/0174021 A1 | 7/2013 | Buchwald et al. | |
| 2013/0298010 A1 | 11/2013 | Rogers et al. | |
| 2014/0047318 A1* | 2/2014 | Glazkov | G06F 9/4443 715/234 |
| 2015/0007133 A1 | 1/2015 | Antipa | |
| 2015/0220492 A1* | 8/2015 | Simeonov | G06F 17/30893 715/235 |
| 2016/0070427 A1* | 3/2016 | Furtwangler | G06F 17/227 715/762 |

OTHER PUBLICATIONS

Eric Bidelman, Shadow DOM 201_CSS and Styling, Apr. 10, 2014, HTML5 Rocks found at https://www.html5rocks.com/en/tutorials/webcomponents/shadowdom-201/.*

Anonymous, Using @import To Call Your CSS Files, Apr. 25, 2007, OS Templates found at http://www.os-templates.com/journal/cascading-style-sheets/using-at-import-to-call-your-css-files.*

"Assigning Property Values, Cascading, and Inheritance", Available at: <<http://www.w3.org/TR/CSS2/cascade.html>>, May 2, 2009, pp. 7.

Lazaris, Louis, "CSS Opacity That Doesn't Affect Child Elements", Available at:<<http://www.impressivewebs.com/css-opacity-that-doesnt-affect-child-elements/>>, Jul. 28, 2009, pp. 16.

Hyatt, David, "Writing efficient CSS", Available at:<<https://developer.mozilla.org/en-US/docs/Web/Guide/CSS/Writing_efficient_CSS>>, Apr. 21, 2000, pp. 6.

Shannon, Ross, "Advanced Selectors", Available at: <<http://www.yourhtmlsource.com/stylesheets/advancedselectors.html>>, Aug. 13, 2013, pp. 5.

Walsh, David, "Add Rules to Stylesheets with JavaScript", Available at: <<http://davidwalsh.name/add-rules-stylesheets>>, Sep. 4, 2014, pp. 27.

Meyer, Eric A., "Fixing Table Inheritance in Quirks Mode", Available at: <<https://developer.mozilla.org/en/docs/Fixing_Table_Inheritance_in_Quirks_Mode>>, Nov. 26, 2002, pp. 3.

"Code: Use Inheritance to Eliminate Duplicate Declarations", Available at: <<http://www.websiteoptimization.com/secrets/css/inheritance.html>>, Oct. 6, 2008, pp. 3.

"Office Action Issued in Colombian Patent Application No. NC2017/0009120", dated Sep. 14, 2017, 3 Pages.

"International Search Report & Written Opinion Issued in PCT Application No. PCT/US2016/022992", dated Jun. 16, 2016, 7 Pages.

NC2017/0009120, "Office Action Issued in Colombian Patent Application No. NC2017/0009120", dated May 30, 2018, 21 Pages.

"Office Action Issued in Chile Patent Application No. 201702307", dated Oct. 16, 2018, 13 Pages.

"Extended European Search Report Issued in European Patent Application No. 16765801.2", dated Oct. 25 2018, 7 Pages.

* cited by examiner

Figure 2

| |
|---|
| TRANSITION 320 |
| IMPORTANT USER AGENT 318 |
| IMPORTANT USER 316 |
| IMPORTANT OVERRIDE 314 |
| IMPORTANT AUTHOR 312 |
| ANIMATION 310 |
| NORMAL OVERRIDE 308 |
| NORMAL AUTHOR 306 |
| NORMAL USER 304 |
| NORMAL USER AGENT 302 |

CONDITIONALLY CONTROLLED STYLING

PRIORITY INFORMATION

This application claims priority from U.S. Provisional Patent Application Ser. No. 62/135,161, filed Mar. 18, 2015, the contents of which are incorporated herein by reference in its entirety.

BACKGROUND

A computing device may render a data content set described in a markup language for presentation to a user as a document. A markup language is a language that facilitates annotating a text document that separates an annotation from the text to be presented to the user, such as a hypertext markup language. A data content set may describe the document as a document tree having multiple nodes. Each node may describe a document component of the document. Different authors may create different document components of the document.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Examples discussed below relate to creating a document from a document tree by determining whether a style property of a source node of the document tree may be applied to a target node of that document tree. The document rendering device may store a document tree having multiple nodes describing a document having component arranged hierarchically in a parent-child relationship. The document rendering device may identify a styling permission describing whether a target node representing a child component of the document tree permits application of a style property to the target node. The document rendering device may execute an inheritance determination for the target node based on the styling permission to determine whether the target node inherits the style property from a source node representing a parent component. The document rendering device may render the target node based on the inheritance determination to create a document component of the document.

DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a document rendering device, a computing device, or a machine-implemented method.

In one example, a document rendering device may create a document from a document tree by determining whether a style property of a source node of the document tree may be applied to a target node of that document tree. The document rendering device may store a document tree having multiple nodes describing a document having component arranged hierarchically in a parent-child relationship. The document rendering device may identify a styling permission describing whether a target node representing a child component of the document tree permits application of a style property to the target node. The document rendering device may execute an inheritance determination for the target node based on the styling permission to determine whether the target node inherits the style property from a source node representing a parent component. The document rendering device may render the target node based on the inheritance determination to create a document component of the document.

By creating a styling permission within a target node representing a child component, the author of a document may protect that child component from stylistic bleed from a parent component. The author of a document may isolate a specific style property of a child component to be available for styling or protected from styling. On a more granular level, the author may specify a specific range of property values for a style property. Thus, in a collaborative environment having several authors each creating a document component of the document, the author of the main document may maintain the overall stylistic cohesion of the document. Additionally, the author may prevent higher order document components from overwriting the individual styles of the lower order document components.

Web designers may arrange web pages of a document hierarchically in a parent-child relationship. A document tree having multiple nodes may represent the document and component web pages. The parent page typically may be called the host, or represented by a source node in a document tree. The child page typically may be represented by a target node in a document tree. In regard to styling of these pages, a style may be fully restricted or fully allowed depending on the composition method.

A document rendering device may use a cascading style sheet to apply a style property across multiple elements, collating style rules. By way of cascading and inheritance, a style sheet may propagate a property value across multiple elements. A cascading style sheet is a language structure for describing the rendering of a structured document, as described with a hypertext markup language or an extensible markup language, across varied output devices, such as a display screen, a paper, a speech output, or other media.

Cascading may allow multiple style sheets to influence the presentation of a document. When different declarations describing a style property set a value for the same style property combination, the document rendering device may use cascading style sheets to resolve the conflicts. A style sheet may have a cascade level indicating a sheet hierarchy for the style sheet to resolve conflicts with style properties in other style sheets. Conversely, when a style sheet fails to set a value for a style property, the document rendering device may find a value using inheritance and a style property's initial value.

A document rendering device may determine a cascade level based on the source of the style sheet or by other criteria. Thus, for example, a style choice imposed by a web-browser may be altered by plug-ins or by the web page being downloaded. Using an element-styling access control language for cascade style sheets, a style sheet author may restrict styling to certain elements of the page, for example, to prevent accidental styling from other style sheets. In composed scenarios, a style sheet author may grant a host permission to style children elements based on rules defined by the child.

A cascading style sheet is currently unable to provide style "isolation" within a style sheet. A style applied via a selector may apply within the document. Specificity and order may control which properties apply, but individual elements may be "unprotected" from being styled.

When many designers collaborate on a document, such as a web site, they may work independently. When their respective style sheets are brought together, these style sheets may conflict with each other causing undo styling 'bleed', due to overly generic or overly specific selectors. Authors may wish to describe a set of enforcements on property styling for target elements within a document. In the case of composed web pages, which may bring together two documents via an iframe Hypertext Markup Language (HTML) element or add element trees to a document in a shadow-document object model (DOM), protecting against unwanted styling "bleed" may be even more important in the case where styles would ordinarily 'bleed' naturally. In other cases, current convention may prevent style 'bleed' even where such style 'bleed' may be useful under controlled circumstances.

An enhanced style control may enable style sheet authors to control the styles that may or may not be applied to a given element. The enhanced style control may provide control at various granularity levels for either local or cross-boundary style sheet rules. The enhanced style control may allow an all-or-none application of properties at the element level, styling specific properties on a per-element basis, or specific property values on the property level.

By modifying the behavior of the '>>>' shadow-DOM boundary combinator, a style sheet may subject a combinator to permission controls with regard to 'boundary' styling. The style sheet may extend the combinator to apply to iframe boundaries, while using the 'boundary' styling control to grant style 'bleed' in specific scenarios.

Currently styling for Shadow DOMs may allow for full 'bleed' of styles by default. A child component may have authority over actions a parent component may perform upon a child component. In order for an enhanced stylistic control to be effective, a child components may disallow access to the child component that may affect or alter the stylistic rules. The style sheet may construct a styling permission describing whether the target node permits application of a style property to the target node. The styling permission may have a styling default to deny or allow access to a style property in a target node. The style sheet may list a property exception indicating a style property that the source node may access. The style sheet may use different property exception selectors to apply different granularity of controls.

At the element level, a cascading style sheet property may apply stylistic controls to an element matched by the selector. For example, the selector may define "allowed: all local" to set the default permission of an element to allowed for local author definitions. The selector may define "allowed: all boundary" to set the default permission of an element to allowed for cross-boundary applications. The selector may define "allowed: none boundary" to set the default permission of an element to restricted for cross-boundary applications. The selector may define "allowed: none local boundary" to set the default permission of an element to restricted for local authors and cross-boundary applications. The selector may define "allowed: auto" to set the default permission of an element to allowed for local authors and application dependent permission for cross-boundary applications.

The stylistic control may provide a syntax to define individual properties and property values as exceptions to the defaults defined by the default permission. If no default is defined, the default permission may revert to an auto default. For example, the selector may define "allowed: all my-exceptions local" to set the default permission of an element to allowed for local author definitions, with a list of exceptions. The selector may define "allowed: none my-exceptions local" to set the default permission of an element to restricted for cross-boundary applications, with a list of exceptions. For example, the listed exceptions may read:

```
@allowed my-exceptions {
    background none;
    color none;
    border none;
}
```

Further, style permissions may combine rules using a comma-separated list of identifier names. The selector may define "allowed: color-exceptions, box-model-exceptions;" to set the default permission of an element for cross boundary applications to be application-dependent, dependent on the hosting component. The first exception may read:

```
@allowed color-exceptions {
    Color all;
}
@allowed box-model-exceptions{
    display none;
}
```

Both property exceptions may be merged from each rule, with conflicts resolved based on the order listed.

The applicability of a declaration may be scoped to include just a certain target domain. For example, the selector may define "allowed: defs boundary none" to scope the allowances within a declaration. The declaration may read:

```
@allowed defs {
    @document domain-of-applicability.com {
        display none;
        background-color all;
```

-continued

```
        visibility none {hidden;}
    }
}
```

The more granular controls may apply permissions allowing or restricting access at each level in the cascade. Ultimately, the syntax of selectors may allow natural rule specificity to apply a final result to every element matched in the document. The target node may then apply a final access-allowed flag at the element-level as further style sheets are evaluated.

A function value "or" may handle enumerated types. For example, the syntax in this instance may read as follows:

```
@allowed blocky-exceptions{
    display: or(inline, block, inline-block, run-in);
}
```

Alternately, the function value may list a range of values. For example, a target node may grant changes within a subset of display values, using the following syntax:

```
@allowed blocky-exception{
    display: bnf(block | inline-block | inline);
}
```

Figure 1:
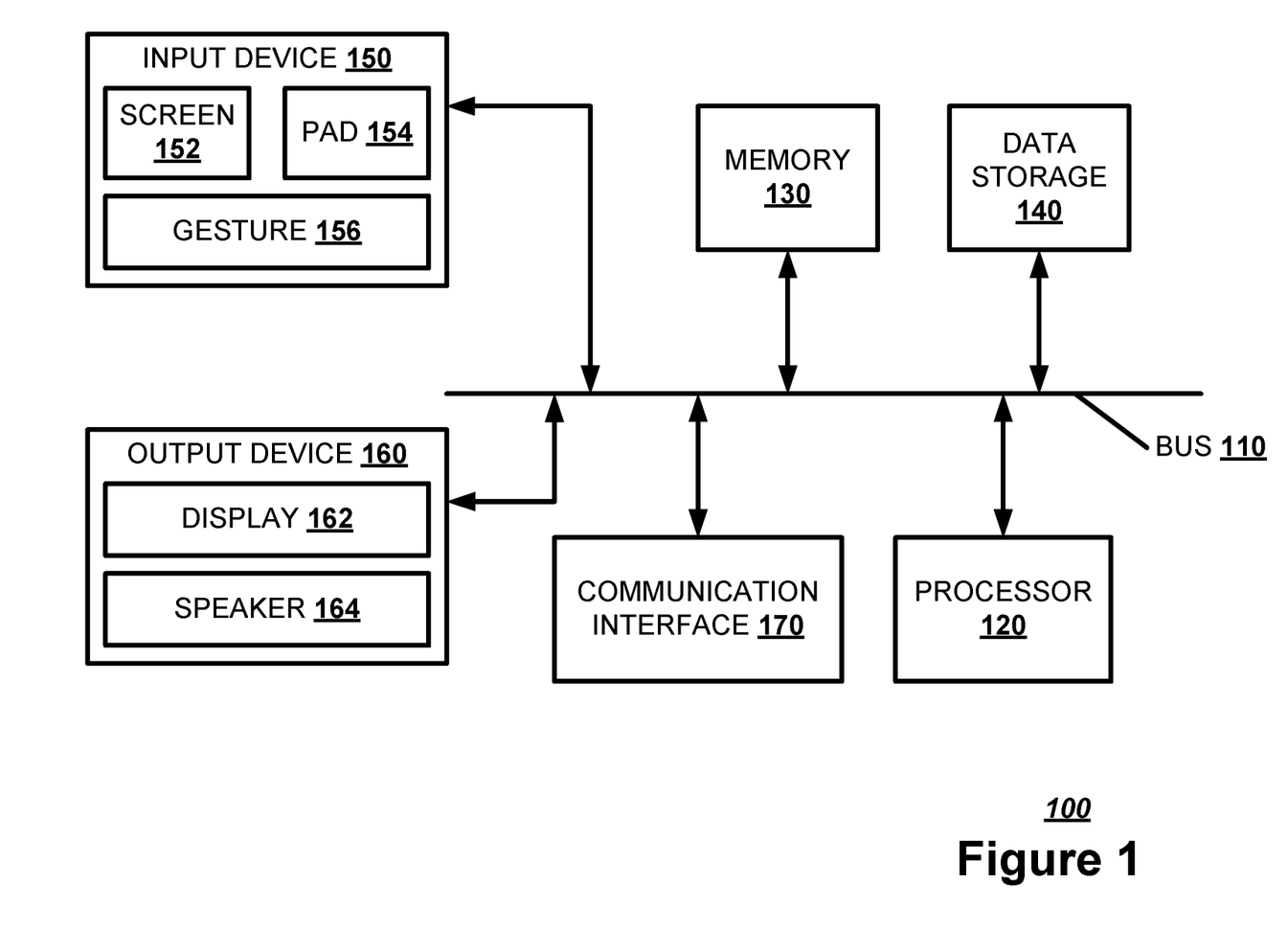
FIG. 1 illustrates, in a block diagram, one example of a computing device.

FIG. 1 illustrates a block diagram of an exemplary computing device 100 which may act as a data rendering device. The computing device 100 may combine one or more of hardware, software, firmware, and system-on-a-chip technology to implement a data rendering device. The computing device 100 may include a bus 110, a processing unit 120, a memory 130, a data storage 140, an input device 150, an output device 160, and a communication interface 170. The bus 110, or other component interconnection, may permit communication among the components of the computing device 100.

The processing unit 120 may include at least one conventional processor or microprocessor that interprets and executes a set of instructions. The at least one processor may be configured to identify a styling permission describing whether a target node representing a child component of a document tree permits application of a style property to the target node. The at least one processor also may be configured to identify a styling default indicating a default property permission for the target node. The at least one processor further may be configured to identify a property exception indicating a property access exception for a style property of the target node. The at least one processor further may be configured to identify a property default indicating a default value permission for a style property. The at least one processor may identify a value permission describing whether the document tree permits application of a value for a style property of the document tree. The at least one processor further may be configured to identify a value exception indicating a value access exception for a value of the style property. The at least one processor further may be configured to identify a continuous value range for a value of a style property. The at least one processor may be configured to identify a restricted property based on the inheritance determination.

The at least one processor additionally may be configured to omit processing of a source node style property for a restricted property upon identifying the restricted property based on the inheritance determination. The at least one processor further may be configured to execute an inheritance determination for the target node based on the styling permission to determine whether the target node inherits the style property from a source node representing a parent component. The at least one processor may further be configured to execute an inheritance determination for a target node representing a child component of the document tree based on the value permission to determine whether the target node inherits the value of the style property from a source node representing a parent component. The at least one processor may render the target node based on the inheritance determination to create a document component of the document. The at least one process further may be configured to insert a document component into a document represented by the document tree.

The memory 130 may be a random access memory (RAM) or another type of dynamic data storage that stores information and instructions for execution by the processor 120. The memory 130 may also store temporary variables or other intermediate information used during execution of instructions by the processor 120. The memory 130 may be configured to store a series of instructions to execute a document rendering application. The memory 130 may be configured to store a document tree having multiple nodes describing a document having document components arranged hierarchically in a parent-child relationship. The memory 130 may be configured to store a style sheet describing the styling permission as an author style sheet at an author cascade level.

The data storage 140 may include a conventional ROM device or another type of static data storage that stores static information and instructions for the processor 120. The data storage 140 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 140 may store a set of instructions detailing a method that when executed by one or more processors cause the one or more processors to perform the method. The data storage 140 may also be a database or a database interface for storing a data content set and style sheets.

The input device 150 may include one or more conventional mechanisms that permit a user to input information to the computing device 100, such as a keyboard, a mouse, a voice recognition device, a microphone, a headset, a touch screen 152, a touch pad 154, a gesture recognition device 156, etc. The output device 160 may include one or more conventional mechanisms that output information to the user, including a display screen 162, a printer, one or more speakers 164, a headset, a vibrator, or a medium, such as a memory, or a magnetic or optical disk and a corresponding disk drive. The display screen 162 may be configured to display a document component to a user.

The communication interface 170 may include any transceiver-like mechanism that enables computing device 100 to communicate with other devices or networks. The communication interface 170 may include a network interface or a transceiver interface. The communication interface 170 may be a wireless, wired, or optical interface. The communication interface 170 may be configured to import a style sheet describing the styling permission from at least one of a plug-in and a data content set containing the document tree. The communication interface 170 may be configured to import a style sheet describing the styling permission as a user style sheet at a user cascade level.

The computing device 100 may perform such functions in response to processor 120 executing sequences of instructions contained in a computer-readable medium, such as, for example, the memory 130, a magnetic disk, or an optical disk. Such instructions may be read into the memory 130 from another computer-readable medium, such as the data storage 140, or from a separate device via the communication interface 160.

Figure 2:
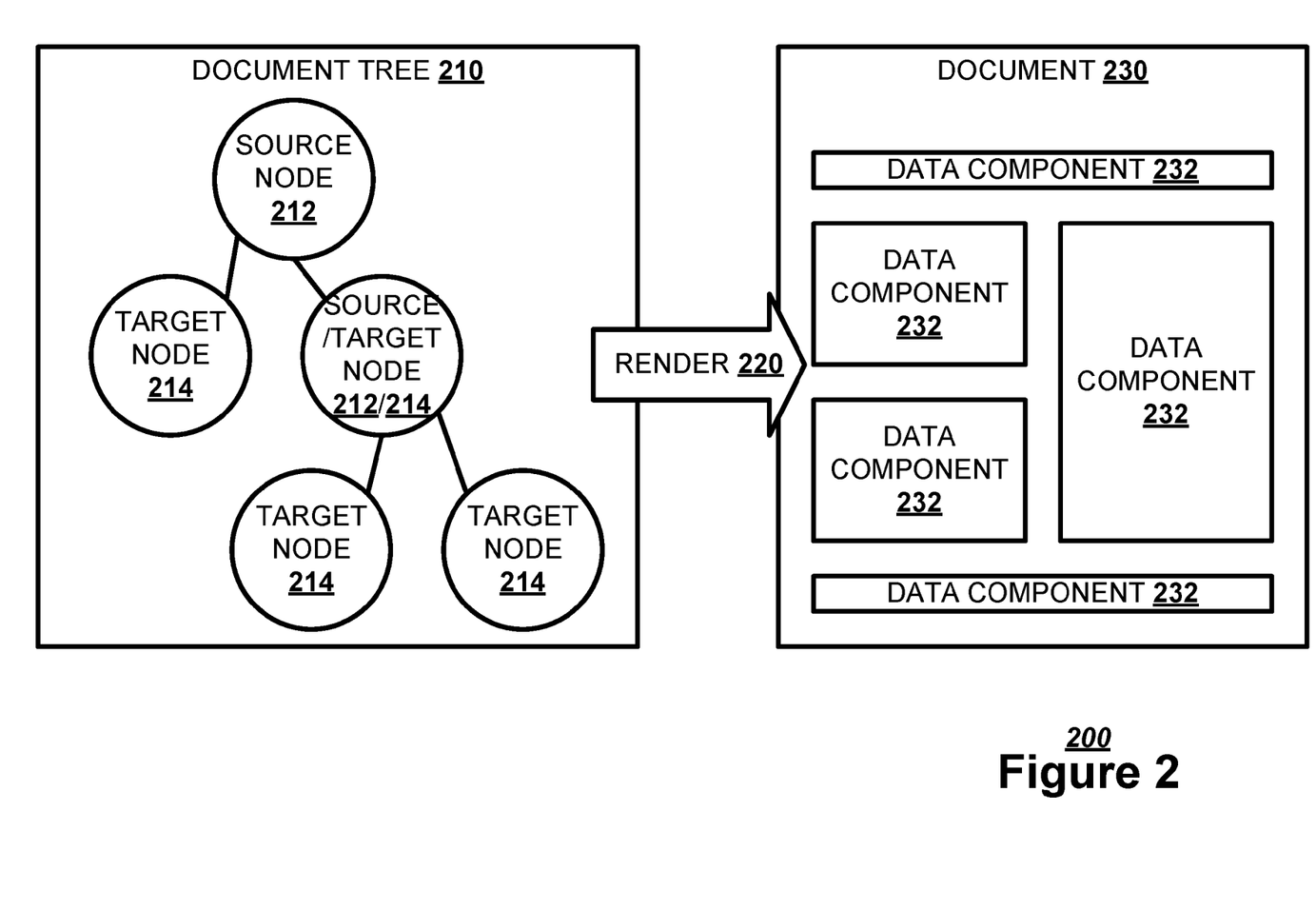
FIG. 2 illustrates, in a block diagram, one example of a document rendering process.

FIG. 2 illustrates, in a block diagram, one example of a document rendering process 200. The document rendering device may process a data content set, written in a markup language organizing the data content set as a document tree 210. The document tree 210 may have a set of one or more nodes. A node of the document tree 210 may be a source node 212 or a target node 214. The source node 212 may provide context or structure within the document tree for the target node 214. A node may be a source node 212 for a node lower in the document tree 210 and a target node 214 for a node higher in the document tree 210. The document rendering device may render 220 the document tree 210 into a document 230. Each node of the document tree 210 may be rendered 220 into a document component 232 composing the document 230. For example, the document component 232 may be a graph, a text piece, an audio clip, a video, an applet, a menu, or a frame.

The document rendering device may format each document component 232 based on a set of one or more style sheets describing a set style properties. The document rendering device may introduce a style sheet via any one of a number sources. The document rendering device may use a set of cascading style sheets to select between conflicting properties from multiple style sheets. A style property of a style sheet from a higher cascade level may overwrite a conflicting style property of a style sheet from a lower cascade level. For example, if a style sheet with a high cascade level describes a text as having a red color and a style sheet with a low cascade level describes a text as having a green color, the text of the rendered document has a red color. The document rendering device may assign the cascade level based on the source of the style sheet.

Figure 3:
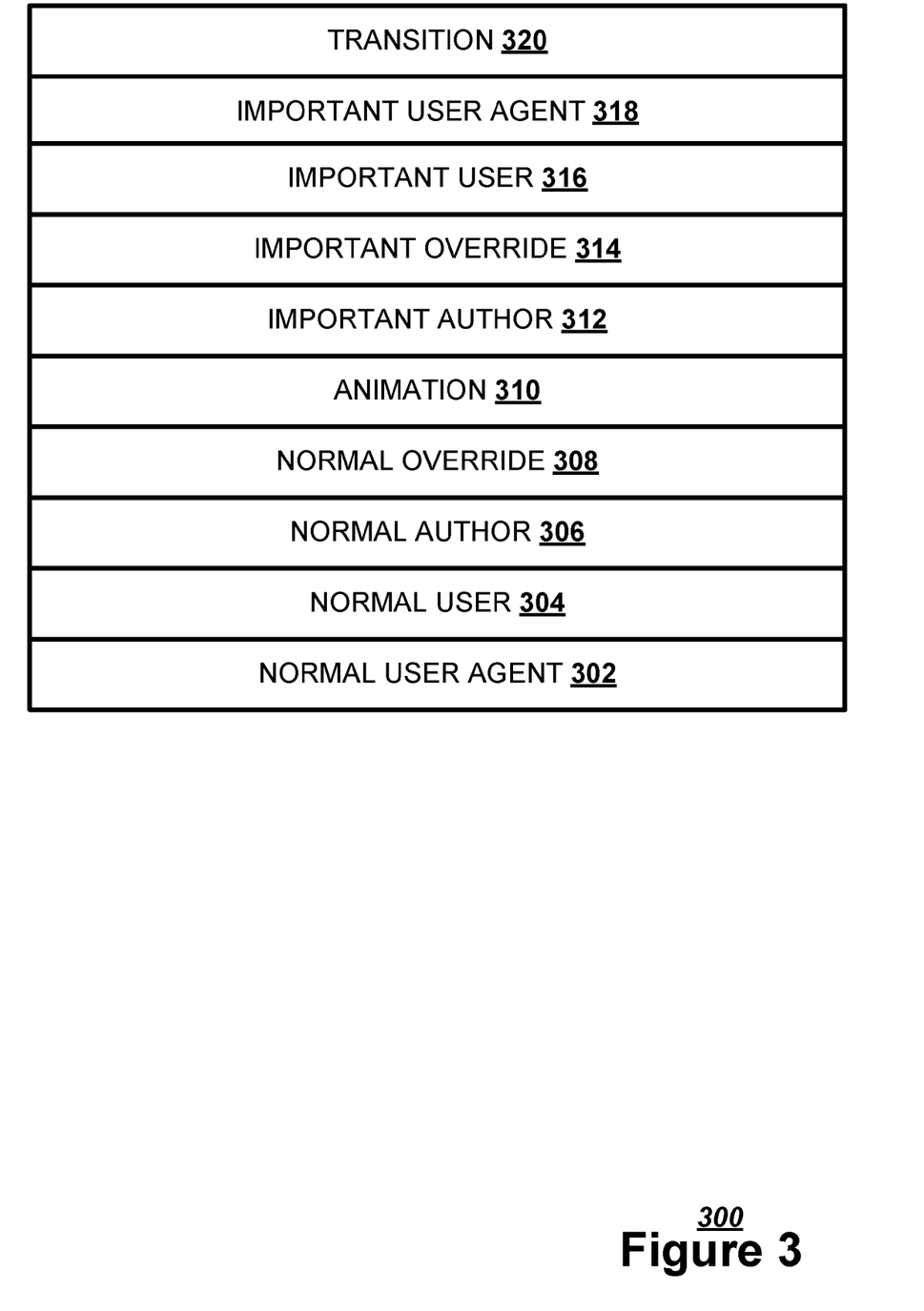
FIG. 3 illustrates, in a block diagram, one example of a cascade level hierarchy.

FIG. 3 illustrates, in a block diagram, one example of a cascade level hierarchy 300. At a lowest cascade level, the document rendering device may receive a user agent style sheet from a user agent application, such as a browser, at a normal user agent cascade level 302. At a higher cascade level, the document rendering device may receive a user style sheet from a user application, such as a user interface add-in, at a normal user cascade level 304. The document rendering device may receive an author style sheet from a data content set, such as a web page, at a normal author cascade level 306. The document rendering device may receive an override style sheet from an application script, such as an application, at a normal override cascade level 308. The document rendering device may receive an animation style sheet from an animation at a normal animation cascade level 310.

A style sheet may use a property hierarchy indicator label of important to create a reprioritized order of cascade levels on top of the normal cascade levels. The property hierarchy indicator label of important may be described using the text string "¦important". Above a normal cascade level, the document rendering device may receive an important author style sheet from a data content set at an important author cascade level 312. The document rendering device may receive an important override style sheet from an application script at an important override cascade level 314. The document rendering device may receive an important user style sheet from a user application at an important user cascade level 316. The document rendering device may receive an important user agent style sheet from a user agent application at an important user agent cascade level 318. At the highest cascade level, the document rendering device may receive a transition style sheet to transition a property value from a user agent application at a transition animation cascade level 320.

Figure 4:
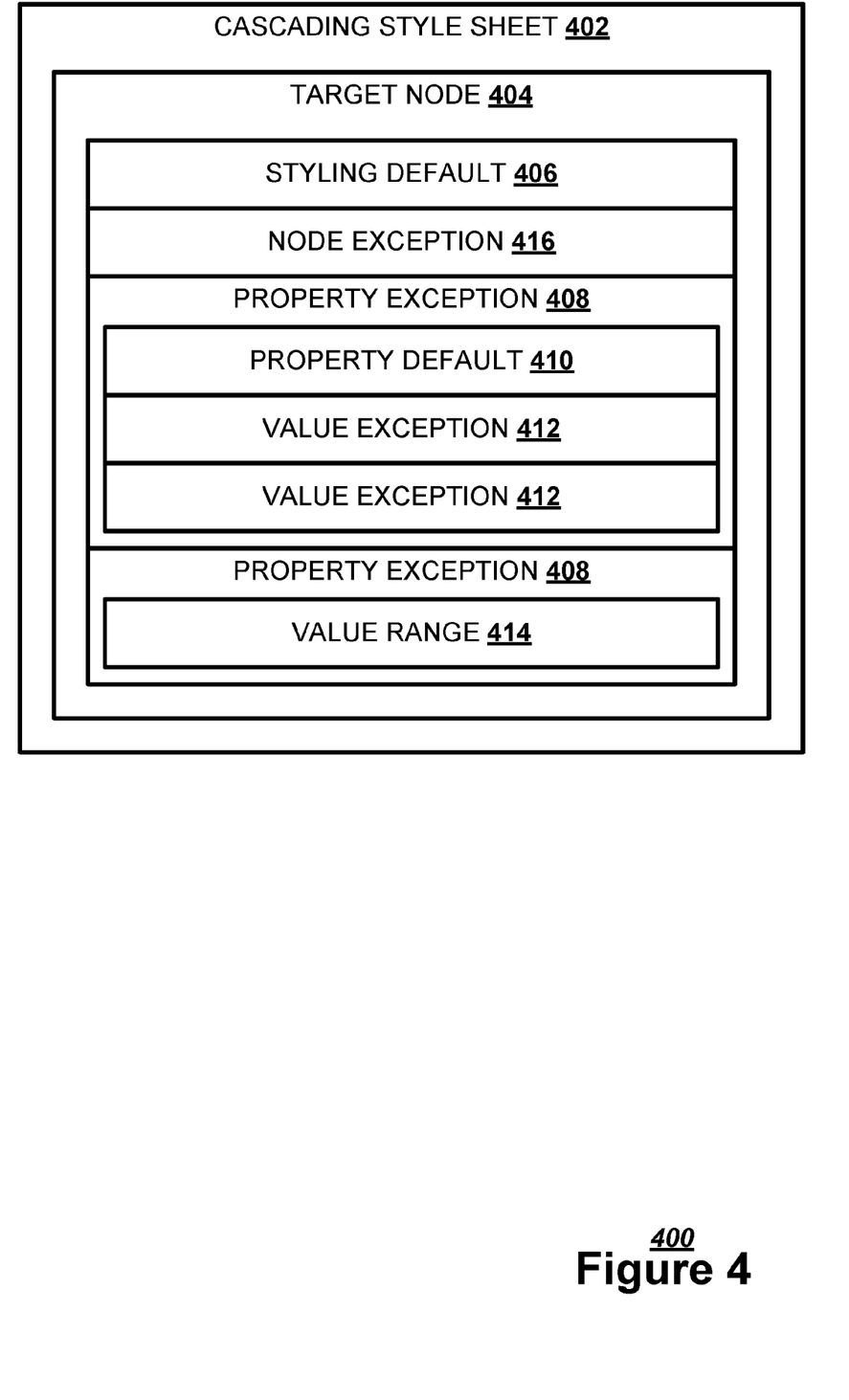
FIG. 4 illustrates, in a block diagram, one example of a cascading style sheet architecture.

FIG. 4 illustrates, in a block diagram, one example of a cascading style sheet architecture 400. A cascading style sheet 402 may have multiple target node listings 404, each having a styling permission describing whether the target node allows or restricts the document from applying a style property to the target node. The target node listing 404 may set a styling default 406 indicating a default property permission for a target node. The default property permission may indicate that each source node in the document tree is restricted or allowed from changing any style property in a target node unless explicitly named in a property exception 408. A property exception 408 may describe a style property with a different access permission than the default property permission. For example, if the styling default 406 indicates that a target node restricts a source node generally from applying a style property, a property exception 408 for that target node may allow the color of the text to be altered by the source node.

Additionally, each property exception 408 may have a property default 410, indicating a default value permission for a style property. A value permission describes whether application of a value for a style property is permitted. A default value permission may indicate that a source node is restricted or allowed from changing a specific style property in a target node unless explicitly named in a value exception 412. A value permission may indicate a value access exception for a value of the style property. For example, if the property exception 408 indicates that a target node restricts a source node generally from altering the color of the text of the target node, a value exception 412 may allow the color of the text to be changed to blue or green by the source node. Alternately, a target node may set a continuous value range 414 for a value of a style property. For example, the target node may establish that a source node may set the width of a document component to be between 40 and 50 pixels. Further, a target node listing 404 may list a source node exception 416 in instances when the cascading style sheet 402 is used across multiple nodes. A source node exception 416 may describe a source node with a different access permission than the styling default 406.

Figure 5:
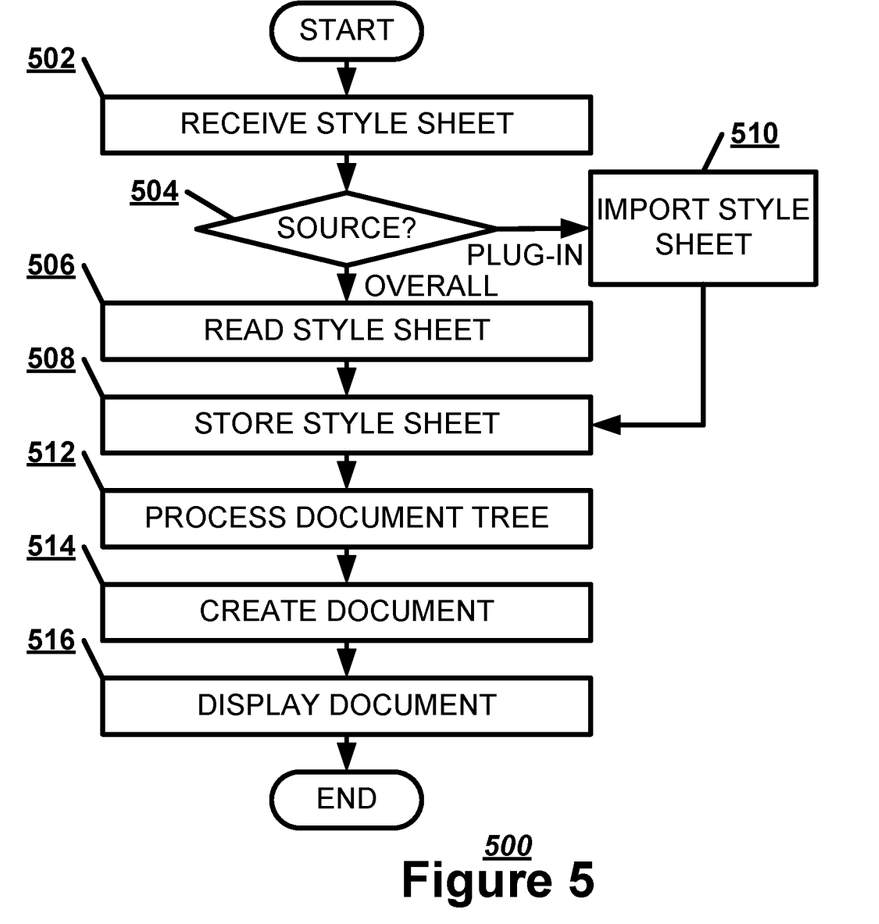
FIG. 5 illustrates, in a flowchart, one example of a method creating a document.

FIG. 5 illustrates, in a flowchart, one example of a method 500 creating a document. The document rendering device may receive a style sheet having a style property describing a formatting to be applied to a data content set (Block 502). If the document rendering device receives the style sheet as part of the overall document (Block 504), the document rendering device may read the style sheet describing the styling permission as an author style sheet at an author cascade level (Block 506). The document rendering device may store the author style sheet at an author cascade level in a memory of the document rendering device (Block 508). If the document rendering device receives the style sheet as part of a plug-in for the rendering application (Block 504), the document rendering device may import the style sheet describing the styling permission as a user style sheet at a user cascade level (Block 510). The document rendering device may store the user style sheet at a user cascade level in a memory of the document rendering device (Block 508). The document rendering device may process a document tree having multiple nodes describing a document having document components arranged hierarchically in a parent-child relationship (Block 512). The document rendering device may create the document from the document components (Block 514). The document rendering device may display the document components in a document to a user (Block 516).

Figure 6:
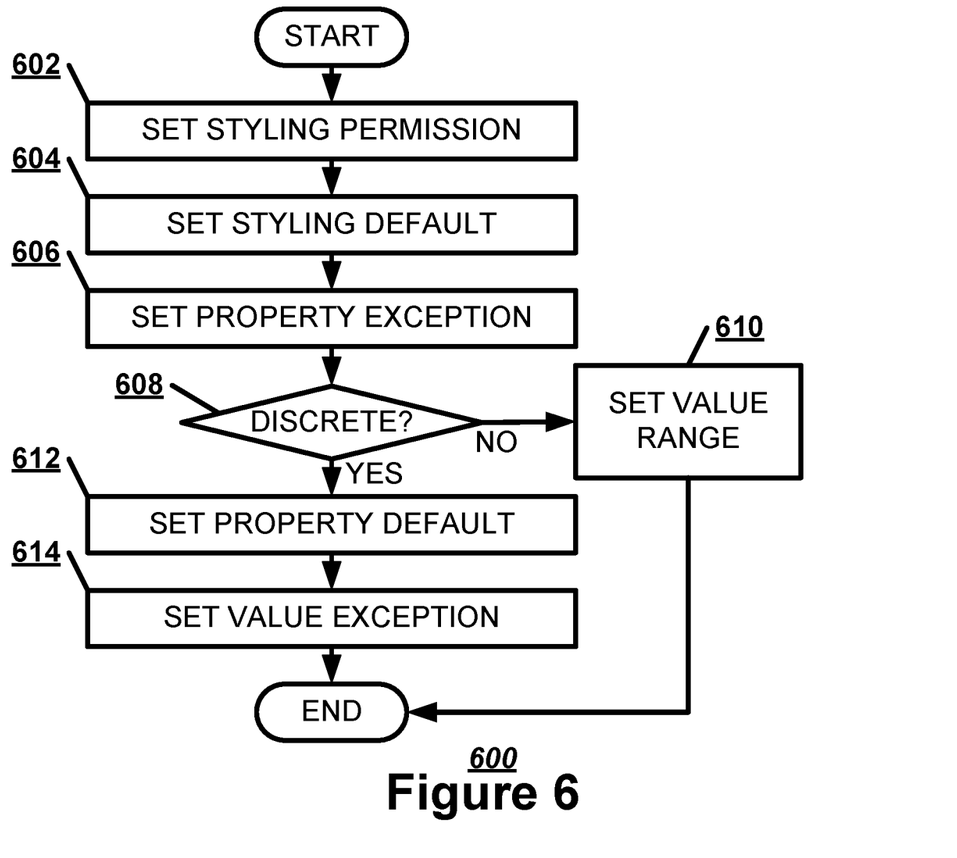
FIG. 6 illustrates, in a flowchart, one example of a method for conveying an inheritance criteria.

FIG. 6 illustrates, in a flowchart, one example of a method 600 for conveying an inheritance criteria for creating a document component. The cascading style sheet may set a styling permission for a target node of a document tree (Block 602). The cascading style sheet may set a styling default indicating a default property permission for the target node (Block 604). The cascading style sheet may set a property exception indicating a property access exception for a style property of the target node (Block 606). If the style property has a continuous value range (Block 608), the cascading style sheet may set a continuous value range for a value of the style property (Block 610). If the style property has a discrete value range (Block 608), the cascading style sheet may set a property default indicating a default value permission for a style property (Block 612). The cascading style sheet may set a value exception indicating a value access exception for a value of a style property (Block 614).

Figure 7:
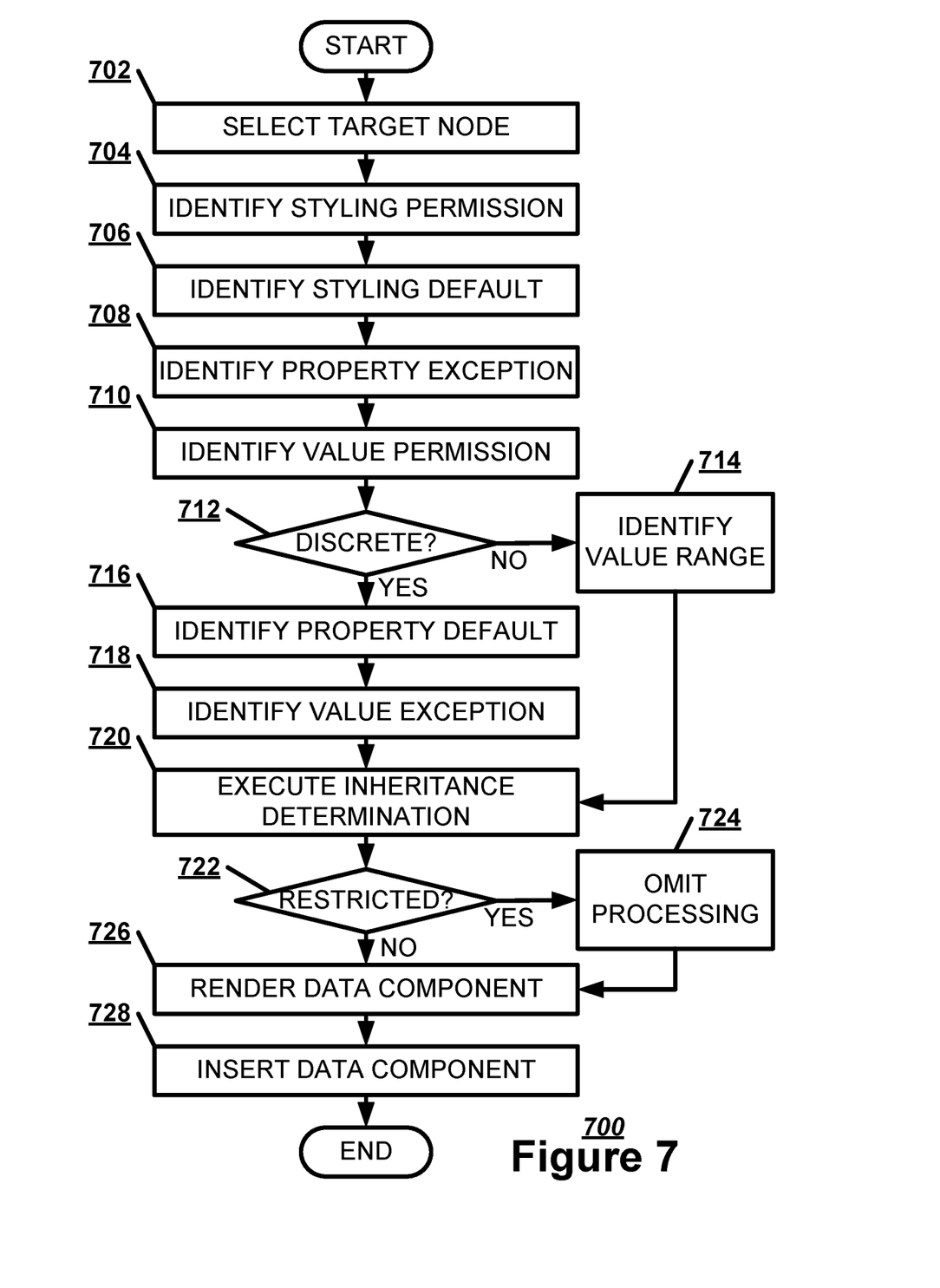
FIG. 7 illustrates, in a flowchart, one example of a method for processing a cascading style sheet.

FIG. 7 illustrates, in a flowchart, one example of a method 700 for processing a cascading style sheet. The document rendering device may select a target node for rendering (Block 702). The document rendering device may identify a styling permission describing whether a target node representing a child component of a document tree permits application of a style property to the target node (Block 704). The document rendering device may identify a styling default indicating a default property permission for the target node (Block 706). The document rendering device may identify a property exception indicating a property access exception for a style property of the target node (Block 708). The document rendering device may identify a value permission describing whether the document tree permits application of a value for a style property of the document tree (Block 710). If the style property has a continuous value range (Block 712), the document rendering device may identify a continuous value range for a value of the style property (Block 714). If the style property has a discrete value range (Block 712), the document rendering device may identify a property default indicating a default value permission for a style property (Block 716). The document rendering device may identify a value exception indicating a value access exception for a value of a style property (Block 718). The document rendering device may execute an inheritance determination for the target node representing the child component based on the styling permission or a value permission to determine whether a target node may inherit the value from the style property from a source node representing a parent component (Block 720). If the document rendering device identifies a restricted property based on the inheritance determination (Block 722), the document rendering device may omit processing of a source node style property for the restricted property to preserve processing resources (Block 724). The document rendering device may render the target node based on the inheritance determination to create a document component of the document (Block 726). The document rendering device may insert the document component into a document (Block 728).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Examples within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the computer-readable storage media.

Examples may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described examples are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A document rendering device, comprising:
memory configured to store a document tree having multiple nodes describing a document to be created having document components arranged hierarchically in a parent-child relationship;
a processing unit having at least one processor configured to:
identify a styling permission in a style sheet for a target node describing whether the target node representing a child component of the document tree permits application of a style property to the target node, wherein the styling permission includes a default property permission for the target node and an exception to the default property permission for one or more style properties of the target node;
determine that the style property has a continuous value range;
identify a continuous value range for a value of the property permission for the style property
execute an inheritance determination for the target node to determine whether the target node inherits the style property from a source node representing a parent component based on whether the style property is included in the exception to the default property permission, wherein the inheritance determination includes determining whether the style property from the source node is within the continuous value range; and
render the target node based on the inheritance determination to create a document component of the document; and
a display screen configured to display the document component to a user.

2. The document rendering device of claim 1, wherein the at least one processor is further configured to insert the document component into the document represented by the document tree.

3. The document rendering device of claim 1, wherein the at least one processor is further configured to identify a styling default indicating the default property permission for the target node, wherein the inheritance determination is based on the styling default for styling properties that are not included in the exception to the default property permission.

4. The document rendering device of claim 1, wherein the exception to the default property permission includes a property exception indicating the style property has a different access permission than the default property permission for the target node.

5. The document rendering device of claim 4, wherein the at least one processor is further configured to identify a property default of the property exception indicating a default value permission describing whether application of a value for a style property is permitted for the style property.

6. The document rendering device of claim 5, wherein the at least one processor is further configured to identify a value exception indicating a value access exception for the default value permission of the style property.

7. The document rendering device of claim 1, wherein the at least one processor is further configured to identify a restricted property of the styling permissions based on the inheritance determination and omit processing of a style property of the source node for the restricted property.

8. The document rendering device of claim 1, wherein a style sheet describing the styling permission is at least one of an author style sheet at an author cascade level and a user style sheet at a user cascade level.

9. The document rendering device of claim 1, further comprising:
a communication interface configured to import a style sheet describing the styling permission from at least one of a plug-in and a data content set containing the document tree.

10. A computing device, having a memory to store a series of instructions to execute a document rendering application, the computing device configured to:
process a document tree having multiple nodes describing a document to be created having document components arranged hierarchically in a parent-child relationship;
identify a styling permission in a style sheet for a target node describing whether the target node representing a child component of the document tree permits application of a style property to the target node, wherein the styling permission includes a default property permission for the target node and an exception to the default property permission for one or more style properties of the target node;
identify a value permission describing whether the document tree permits application of a value for the style property of the document tree;
determine that the style property has a continuous value range;
identify a continuous value range for a value of the property permission for the style property;
execute an inheritance determination for a target node representing a child component of the document tree based on whether the style property is included in the exception to the default property permission and the value permission to determine whether the target node inherits the value of the style property from a source node representing a parent component, wherein the inheritance determination includes determining whether the style property from the source node is within the continuous value range;
render the target node based on the inheritance determination to create a document component of the document; and
display the document to a user.

11. The computing device of claim 10, wherein
the computing device is configured to read a style sheet describing the styling permission as an author style sheet at an author cascade level.

12. The computing device of claim 10, wherein
the computing device is configured to import a style sheet describing the styling permission as a user style sheet at a user cascade level.

13. The computing device of claim 10, wherein
the computing device is configured to identify a styling default indicating the default property permission for the target node, wherein the inheritance determination is based on the styling default for styling properties that are not included in the exception to the default property permission.

14. The computing device of claim 10, wherein the exception to the default property permission includes a property exception indicating the style property has a different access permission than the default property permission of the target node.

15. The computing device of claim 14, wherein
the computing device is configured to identify a property default of the property exception indicating a default value permission describing whether application of a value for a style property is permitted for the style property.

16. The computing device of claim 15, wherein
the computing device is configured to identify a value exception indicating a value access exception for the default value permission of the style property.

17. A machine-implemented method, comprising:
processing a document tree having multiple nodes describing a document to be created having document components arranged hierarchically in a parent-child relationship;
identifying a styling permission in a style sheet for a target node describing whether the target node representing a child component of the document tree permits application of a style property to the target node, wherein the styling permission includes a default property permission for the target node and an exception to the default property permission for one or more style properties of the target node;
determining that the style property has a continuous value range;
identifying a continuous value range for a value of the property permission for the style property;
executing an inheritance determination for the target node to determine whether the target node inherits the style property from a source node representing a parent component based on whether the style property is included in the exception to the default property permission, wherein the inheritance determination includes determining whether the style property from the source node is within the continuous value range;
rendering the target node based on the inheritance determination to create a document component of the document; and
displaying the document to a user.

18. The method of claim 17, further comprising:
identifying a restricted property for the target node based on the inheritance determination; and
omitting processing of a style property of the source node for the restricted property.

\* \* \* \* \*